US012592838B2

(12) United States Patent
Cho et al.

(10) Patent No.: US 12,592,838 B2
(45) **Date of Patent: *Mar. 31, 2026**

(54) CRYPTOGRAPHIC ALGORITHM IDENTITY (CAI) CERTIFICATE SELECTION SYSTEM AND METHOD

(71) Applicant: Dell Products, L.P., Round Rock, TX (US)

(72) Inventors: Eugene David Cho, Austin, TX (US); Mukund P. Khatri, Austin, TX (US); Milton Olavo Decarvalho Taveira, Round Rock, TX (US); Judith A. Furlong, Natick, MA (US)

(73) Assignee: Dell Products L.P., Round Rock, TX (US)

( * ) Notice: Subject to any disclaimer, the term of this patent is extended or adjusted under 35 U.S.C. 154(b) by 137 days.

This patent is subject to a terminal disclaimer.

(21) Appl. No.: 18/450,178

(22) Filed: Aug. 15, 2023

(65) Prior Publication Data

US 2025/0062917 A1     Feb. 20, 2025

(51) Int. Cl.
*H04L 9/32*         (2006.01)
*H04L 9/14*         (2006.01)

(52) U.S. Cl.
CPC .............. *H04L 9/3268* (2013.01); *H04L 9/14* (2013.01)

(58) Field of Classification Search
CPC ................................ H04L 9/3268; H04L 9/14
See application file for complete search history.

(56) References Cited

U.S. PATENT DOCUMENTS

| | | | | |
|---|---|---|---|---|
| 8,689,290 | B2 * | 4/2014 | Buer | H04L 9/32 |
| | | | | 713/168 |
| 9,239,920 | B2 * | 1/2016 | Ashkenazi | H04L 9/0866 |
| 9,325,509 | B2 * | 4/2016 | Sato | G06F 21/335 |
| 2011/0197077 | A1 * | 8/2011 | Chan | G06F 21/10 |
| | | | | 713/189 |
| 2017/0346639 | A1 * | 11/2017 | Muftic | H04L 9/3247 |
| 2021/0036861 | A1 * | 2/2021 | Medvinsky | H04L 9/0844 |
| 2022/0095109 | A1 * | 3/2022 | Yu | H04W 12/35 |

* cited by examiner

*Primary Examiner* — Yonas A Bayou
(74) *Attorney, Agent, or Firm* — Fogarty LLP

(57)         ABSTRACT

Systems and methods for cryptographic algorithm identity certificate selection in an Information Handling System (IHS) are described. In one embodiment, an IHS includes a processor, and a memory coupled to the processor. The memory stores program instructions that, upon execution, cause the processor to receive a Certificate Signing Request (CSR) from a server, sign the CSR with a first Cryptographic Algorithm Identity (CAI) key stored in the memory, and send the signed CSR to the server. The server is configured to identify a geographical region that is associated with the first CAI key, identify an approved cryptographic algorithm that is approved for use in the identified region, and send a second CAI key associated with the identified approved cryptographic algorithm. When the IHS receives the second CAI key from the server, it may perform a cryptographic operation using a cryptographic algorithm associated with the second CAI key.

20 Claims, 8 Drawing Sheets

100

100

200

CRYPTOGRAPHIC ALGORITHM IDENTITY (CAI) CERTIFICATE SELECTION SYSTEM AND METHOD

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

Systems and methods for cryptographic algorithm identity certificate selection in an Information Handling System (IHS) are provided herein. In one embodiment, an IHS includes a processor, and a memory coupled to the processor. The memory stores program instructions that, upon execution, cause the processor to receive a Certificate Signing Request (CSR) from a server, sign the CSR with a first Cryptographic Algorithm Identity (CAI) key stored in the memory, and send the signed CSR to the server. The server is configured to identify a geographical region that is associated with the first CAI key, identify an approved cryptographic algorithm that is approved for use in the identified region, and send a second CAI key associated with the identified approved cryptographic algorithm. When the IHS receives the second CAI key from the server, it may perform a cryptographic operation using a cryptographic algorithm associated with the second CAI key.

According to another embodiment, a CAI certificate selection method includes the steps of receiving, by a target Information Handling System (HIS), a Certificate Signing Request (CSR) from a server, signing, by the target IHS, the CSR with a first Cryptographic Algorithm Identity (CAI) key stored in the memory, and sending, by the target IHS, the signed CSR to a server IHS. The method further includes the steps of identifying, by the server IHS, a geographical region that is associated with the first CAI key, identifying, by the server IHS, an approved cryptographic algorithm that is approved for use in the identified region, sending, by the server IHS, a second CAI key associated with the identified approved cryptographic algorithm, receiving, by the target IHS, the second CAI key from the server, and performing, by the target IHS, a cryptographic operation using a cryptographic algorithm associated with the second CAI key.

According to yet another embodiment, a memory storage device having program instructions stored thereon that, upon execution by an Information Handling System (IHS), cause the IHS to receive a Certificate Signing Request (CSR) from a server, sign the CSR with a first Cryptographic Algorithm Identity (CAI) key stored in the memory, send the signed CSR to the server, wherein the server is configured to identify a geographical region that is associated with the first CAI key, and identify an approved cryptographic algorithm that is approved for use in the identified region, and send a second CAI key associated with the identified approved cryptographic algorithm. The program instructions further cause the IHS to receive the second CAI key from the server, and perform a cryptographic operation using a cryptographic algorithm associated with the second CAI key.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Figure 1:
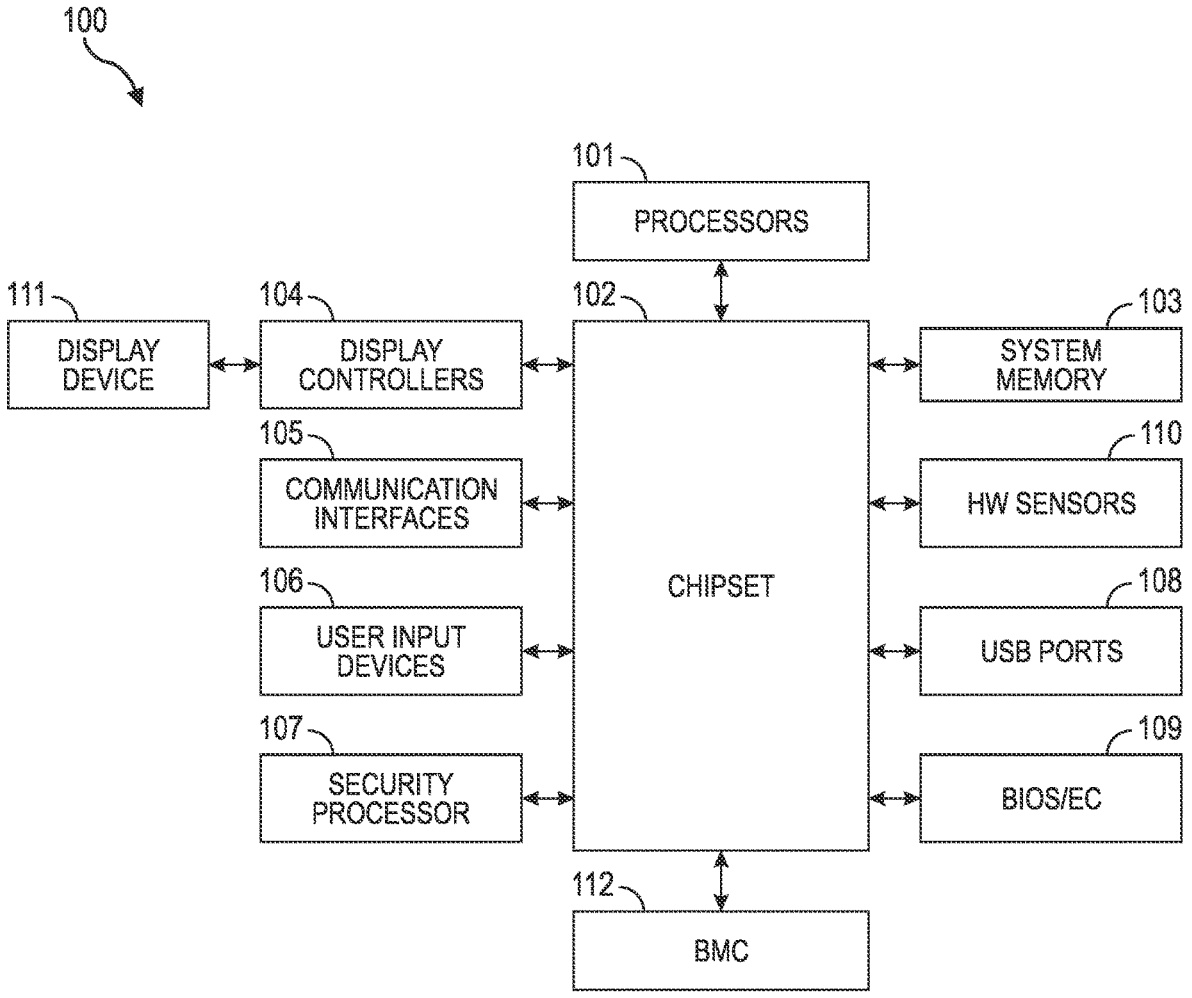
FIG. 1 is a block diagram of components of an example IHS that may implement a Cryptographic Algorithm Identity (CAI) selection system according to one embodiment of the present disclosure.

The present disclosure is described with reference to the attached figures. The figures are not drawn to scale, and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

The present disclosure is described with reference to the attached figures. The figures are not drawn to scale, and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include random access memory (RAM), one or more processing resources such as a central processing unit (CPU) or hardware or software control logic, ROM, and/or other types of nonvolatile memory. Additional components of an IHS may include one or more disk drives, one or more network ports for communicating with external devices as well as various input and output (I/O) devices, such as a keyboard, a mouse, touchscreen and/or a video display. An IHS may also include one or more buses operable to transmit communications between the various hardware components. A more detailed example of an IHS is described with respect to FIG. 1. It should be appreciated that although certain embodiments are discussed in the context of a personal computing device, other embodiments may utilize other types of IHSs.

Certain countries restrict certain computer capabilities or may have specific rules around what sort of hardware they allow within that country. For example, cryptography is the foundation of IHS security, yet cryptographic requirements differ depending upon where in the world an IHS is shipped by its manufacturer because individual countries take it upon themselves to decide which systems to trust. For example, IHSs shipped to U.S. customers include a Trusted Platform Module (TPM), but IHSs shipped to Russia must not have a TPM. Meanwhile, IHSs shipped to China must include a Trusted Cryptographic Module (TCM) instead-yet another part that the manufacturer must maintain. Additionally, certain countries impose restrictions on computer capabilities. For example, export restrictions may have specific rules about the level of performance of an IHS, such as its allowed quantity of processing cores, its maximum clock speed and input/output (I/O) throughput.

In today's manufacturing environment, there is little time to comply with governmental requirements, which often puts sales at risk and can also impact IHS design. In addition, the current turnaround time for firmware updates is much longer than what is necessary to adapt to dynamic regional cryptography policy changes, which requires that multiple regional flavors of firmware be produced (or requires customer configurability, itself a security issue). To address these, and other concerns, various systems and methods described herein may provide a Cryptographic Algorithm Identity (CAI) certificate selection system and method that may be used to securely configure a target IHS with its appropriate CAI key based upon its geographical region as will be described in detail herein below.

FIG. 1 is a block diagram of components of an example IHS 100 that may implement a location-based IHS functionality limiting system according to one embodiment of the present disclosure. As depicted, IHS 100 includes processor 101. In various embodiments, IHS 100 may be a single-processor system, or a multi-processor system including two or more processors. Processor 101 may include any processor capable of executing program instructions, such as a PENTIUM series processor, or any general-purpose or embedded processor(s) implementing any of a variety of Instruction Set Architectures (ISAs), such as an x86 ISA or a Reduced Instruction Set Computer (RISC) ISA (e.g., POWERPC, ARM, SPARC, MIPS, etc.).

IHS 100 includes chipset 102 coupled to processor 101. Chipset 102 may provide processor 101 with access to several resources. In some cases, chipset 102 may utilize a QuickPath Interconnect (QPI) bus to communicate with processor 101. Chipset 102 may also be coupled to communication interface(s) 105 to enable communications between IHS 100 and various wired and/or wireless networks, such as Ethernet, WiFi, BT, cellular or mobile networks (e.g., code-division multiple access or "CDMA," time-division multiple access or "TDMA," Long-Term Evolution or "LTE," etc.), satellite networks, or the like. In some cases, communication interface(s) 105 may be used to communicate with devices (e.g., BT speakers, microphones, headsets, etc.). Moreover, interface(s) 105 may be coupled to chipset 102 via a PCIe bus.

Chipset 102 may be coupled to display controller(s) 104, which may include one or more graphics processor(s) (GPUs) on a graphics bus, such as an Accelerated Graphics Port (AGP) or Peripheral Component Interconnect Express (PCIe) bus. As shown, display controller(s) 104 provide video or display signals to display device 111. In other implementations, any number of display controllers or display devices may be used.

Display device 111 may include Liquid Crystal Display (LCD), Light Emitting Diode (LED), organic LED (OLED), or other thin film display technologies. Display device 111 may include a plurality of pixels arranged in a matrix, configured to display visual information, such as text, two-dimensional images, video, three-dimensional images, etc. In some cases, display device 111 may be provided as a single continuous display, rather than two discrete displays.

Chipset 102 may provide processor 101 and/or display controller(s) 104 with access to system memory 103. In various embodiments, system memory 103 may be implemented using any suitable memory technology, such as static RAM (SRAM), dynamic RAM (DRAM) or magnetic disks, or any nonvolatile/Flash-type memory, such as a solid-state drive (SSD) or the like. System memory 103 may store program instructions that, upon execution by processor 101, enable a collaboration mode for a touchpad coupled or integrated into IHS 100.

Chipset 102 may provide access to components of IHS 100 (e.g., processor(s) 101) with access to security processor 107. In various embodiments, security processor 107 may include a chip or core dedicated to providing encryption or other security operations to IHS 100. For example, security processor 107 may include a Trusted Platform Module (TPM) configured to securely store encryption keys and measurements that help verify the integrity of IHS 100. Additionally, or alternatively, a TPM-like architecture of security processor 107 may be integrated into processor(s) 101, BIIOS/EC 109, a Baseboard Management Controller (BMC) 112, and the like. Other examples of security processor(s) 107 include, but are not limited to: AMD's PLATFORM SECURITY PROCESSOR (PSP), MICROSOFTS's PLUTON, INTEL's CONVERGED SECURITY AND MANAGEMENT ENGINE (CSME), etc.

In some embodiments, security processor 107 may include registers, such as platform configuration registers (PCRs), and secure storage, such as a Non-Volatile Random-Access Memory (NVRAM). Security processor 107 may also include a cryptographic processor that supports various cryptographic capabilities. For example, a pre-boot process implemented by security processor 107 may utilize its cryptographic capabilities to calculate hash values that are based on software and/or firmware instructions utilized by certain core components of IHS 100. These calculated hash values may then be compared against reference hash values that were previously stored in a secure non-volatile memory, such as during factory provisioning of IHS 100. In this manner, security processor 107 may establish a root of trust that includes core components of IHS 100 validated as operating using instructions that originate from a trusted source.

In some embodiments, chipset 102 may also provide access to one or more hard drives, solid state drives, optical drives, or other removable-media drives. In certain embodiments, chipset 102 may also provide access to one or more Universal Serial Bus (USB) ports 108, to which one or more peripheral devices may be coupled (e.g., internal or external webcams, microphones, speakers, etc.).

Chipset 102 may further provide access to one or more user input devices 106, for example, using a super 1/O controller or the like. Examples of user input devices 106 include, but are not limited to, a keyboard, mouse, touchpad, stylus or active pen, totem, etc. Each user input devices 106 may include a respective controller (e.g., a touchpad may have its own touchpad controller) that interfaces with chipset 102 through a wired or wireless connection (e.g., via communication interfaces(s) 105).

In certain embodiments, chipset 102 may also provide an interface for communications with one or more hardware (HW) sensors 110. Sensors 110 may be disposed on or within the chassis of IHS 100, or otherwise coupled to IHS 100, and may include, but are not limited to: electric, magnetic, radio, optical (e.g., camera, webcam, etc.), infrared, thermal, force, pressure, acoustic, ultrasonic, proximity, position, deformation, bending, direction, movement, velocity, rotation, and/or acceleration sensor(s).

Upon booting of IHS 100, processor(s) 101 may utilize Basic Input/Output System (BIOS) instructions of BIOS/Embedded Controller (EC) 109 to initialize and test hardware components coupled to IHS 100 and to load an OS for use by IHS 100. BIOS/EC 109 provides an abstraction layer that allows the OS to interface with certain hardware components that are utilized by IHS 100. Via the hardware abstraction layer provided by BIOS/EC 109, software stored in system memory 103 and executed by processor 101 can interface with certain I/O devices that are coupled to IHS 100. The Unified Extensible Firmware Interface (UEFI) was designed as a successor to BIOS. As a result, many modern IHSs utilize UEFI in addition to or instead of a BIOS. As used herein, BIOS/EC 109 is intended to also encompass a UEFI component.

BIOS/EC 109 may be installed as a Trusted Execution Environment (TEE) component to the motherboard of IHS 100. BIOS/EC 109 may implement operations for interfacing with a power adapter in managing power for IHS 100. Such operations may be utilized to determine the power status of IHS 100, such as whether IHS 100 is operating from battery power or is plugged into an AC power source. Firmware instructions utilized by BIOS/EC 109 may be used to provide various core operations of IHS 100, such as power management and management of certain modes of IHS 100 (e.g., turbo modes, maximum operating clock frequencies of certain components, etc.).

In some implementations, a low-power mode of operation may include the S0 low-power idle model, also known as Modern Standby or Connected Standby, which provides an instant on/off user experience and maintains a network connection for certain processes while consuming very little power. These power modes may be entered, for example, when IHS 100 transitions into standby (e.g., "sleep," etc.).

BIOS/EC 109 may also implement operations for detecting certain changes to the physical configuration or posture of IHS 100 and managing the modes of a touchpad or other user input device 106 in different configurations of IHS 100. For instance, where IHS 100 is a 2-in-1 laptop/tablet form factor, BIOS/EC 109 may receive inputs from a lid position or hinge angle sensor (e.g., one or more of HW sensors 110), and it may use those inputs to determine: whether the two sides of IHS 100 have been latched together to a closed position or a tablet position, the magnitude of a hinge or lid angle, etc.

BIOS/EC 109 may be further configured to calculate hashes or signatures that uniquely identify individual components of IHS 100. In such scenarios, BIOS/EC 109 may calculate a hash value based on the configuration of a hardware and/or software component coupled to IHS 100. For instance, BIOS/EC 109 may calculate a hash value based on all firmware and other code or settings stored in an onboard memory of a hardware component. Such hash values may be calculated as part of a trusted process of manufacturing IHS 100 and may be maintained in secure storage as a reference signature. BIOS/EC 109 may later recalculate the hash value for a component and compare it against the reference hash value to determine if any modifications have been made to the component, thus indicating that the component has been compromised. In this manner, BIOS/EC 109 may validate the integrity of hardware and software components installed on IHS 100.

The IHS 100 may also be configured with a Baseboard Management Controller (BMC) 112 for use in managing various resources of the IHS 100. The BMC 112 may include non-volatile memory having program instructions stored thereon that enable remote management of the IHS 100. For example, BMC 112 may enable a user to discover, configure, and manage the IHS 100, setup configuration options, resolve and administer hardware or software problems, and the like. Additionally or alternatively, the BMC 112 may include one or more firmware volumes, each volume having one or more firmware files used by the BIOS' firmware interface to initialize and test components of the IHS 100.

As a non-limiting example of the BMC 112, the integrated DELL Remote Access Controller (iDRAC) from DELL, INC. is embedded within DELL POWEREDGE servers and provides functionality that helps information technology (IT) administrators deploy, update, monitor, and maintain servers with no need for any additional software to be installed. The iDRAC works regardless of OS or hypervisor presence from a pre-OS or bare-metal state because iDRAC is embedded within the IHS 100 from the factory.

In some embodiments, IHS 100 may not include all the components shown in FIG. 1. In other embodiments, IHS 100 may include other components in addition to those that are shown in FIG. 1. Furthermore, some components that are represented as separate components in FIG. 1 may instead be integrated with other components. For example, all or a portion of the operations executed by the illustrated components may instead be executed by components integrated into processor(s) 101 as systems-on-a-chip (SoC). As such, in various embodiments, IHS 100 may be implemented as different classes of computing devices including, but not limited to: servers, workstations, desktops, laptops, appliances, video game consoles, tablets, smartphones, etc.

Figure 2:
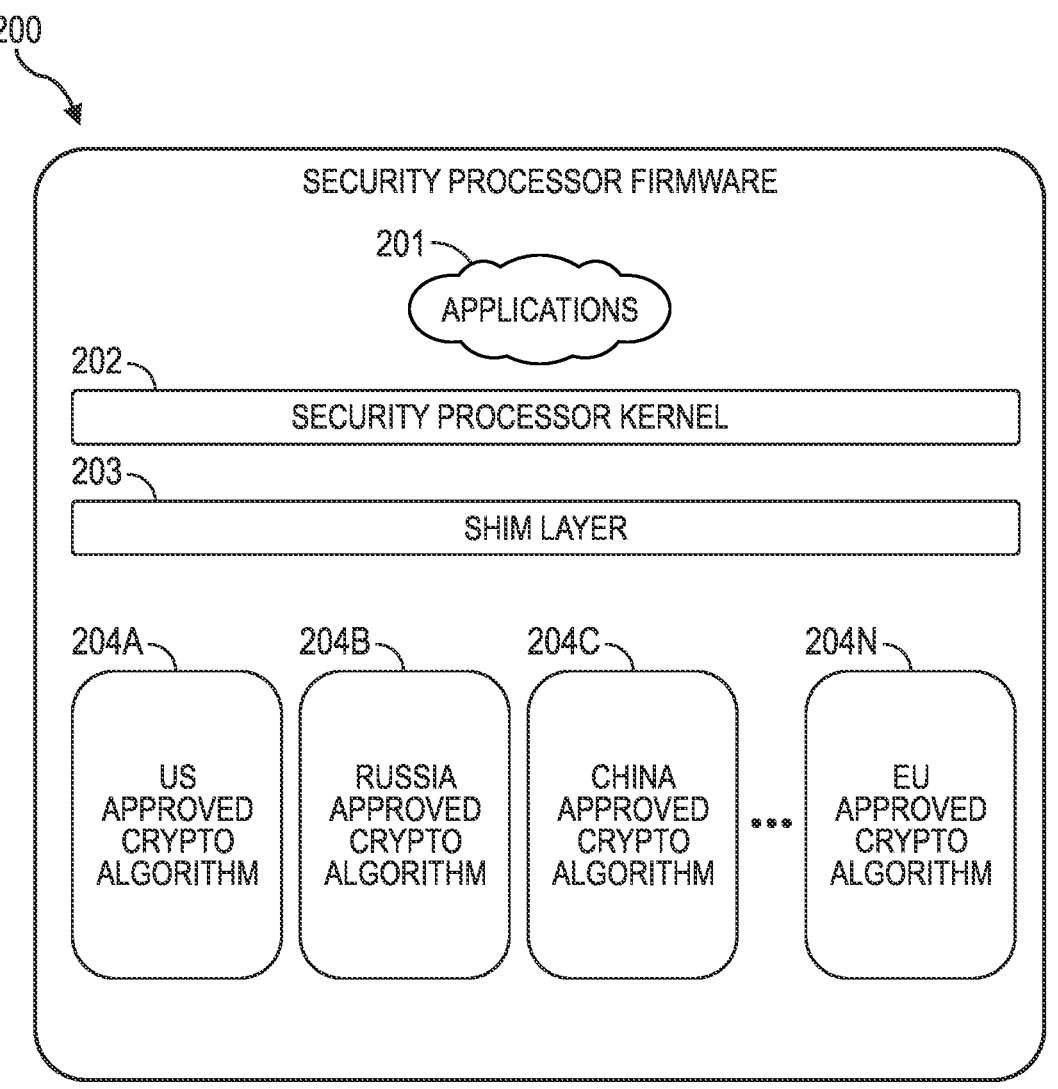
FIG. 2 depicts a diagram of an example security processor firmware according to one embodiment of the present disclosure.

FIG. 2 depicts a diagram of an example security processor firmware 200 according to one embodiment of the present disclosure. Particularly, firmware 200 includes program instructions that, upon execution by security processor 107, are configured to instantiate applications 201, kernel 202, and shim layer 203. Applications 201 include any security application or operation performable by security processor 107 (e.g., any encryption, decryption, key derivation, digital certificate signing, verification, etc.). Kernel 202 includes core routines that expose and manage the capabilities of security processor 107 to applications 201. Shim layer 203 includes a library configured to transparently intercept an Application Programming Interface (API) command, change the parameters therein, handle the command itself, and/or redirect the command elsewhere.

Through shim layer 203, a factory-selected one or more cryptographic algorithms, among a superset of regionally approved cryptographic algorithms 204A-N (e.g., US, Russia, China, EU, etc.), may be accessible to applications 201. Additionally, or alternatively, applications 201 may include one or more APIs for communications with other IHS components (e.g., processor 101). In those cases, security processor 107 may perform security operations using a factory-selected one of algorithms 204A-N (collectively 204) at the request of the other IHS component.

Figure 3:
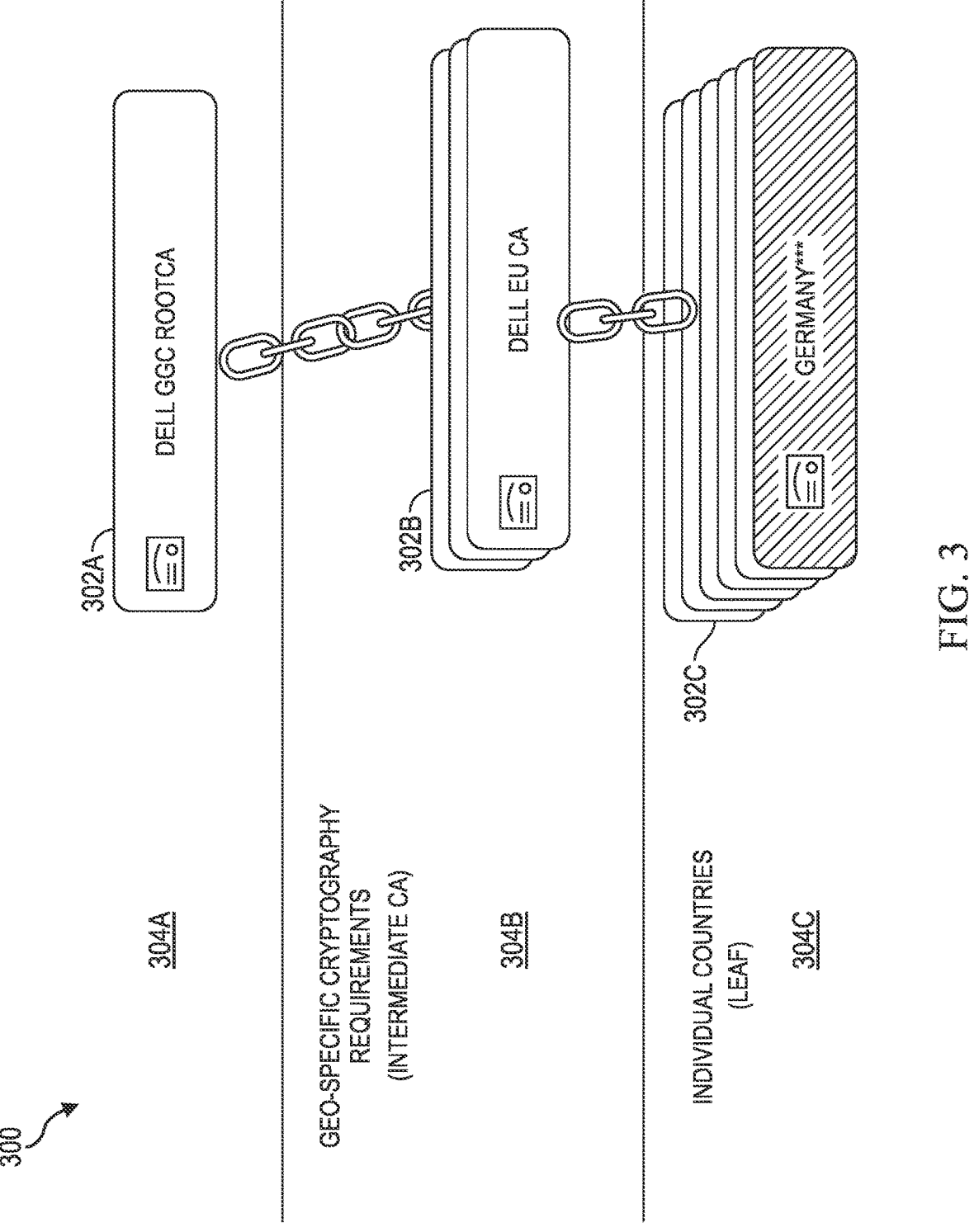
FIG. 3 illustrates an example CAI certificate hierarchical data blob that may be used to support a cryptographic algorithm identity (CAI) certificate selection system according to one embodiment of the present disclosure.

FIG. 3 illustrates an example CAI certificate hierarchical data blob 300 that may be used to support a cryptographic algorithm identity (CAI) certificate selection system according to one embodiment of the present disclosure. The data blob 300 includes a multi-tiered structure with a Global Geographic Cryptography (GGC) root key 302a arranged in a top level tier 304a, several intermediate level keys 302b arranged in an intermediate level tier 304b, and one or more CAI keys 302c (i.e., CAI certificates) arranged in a leaf (e.g., bottom) level tier 304c. While the particular embodiment is shown with three different levels 304a-c (collectively 304), it should be understood that any quantity of levels 304 may exist, such as two levels or more than three levels. Additionally, it should be understood that each of the intermediate and leaf level tiers 304 may have any quantity of keys 302a-c (collectively 302).

Each of the CAI keys 302c can be used to authenticate a particular algorithm 204 for a particular geographic region (e.g., country). Each of the intermediate level keys 302b may function as a verifier for a group of individual geographic regions, such as Latin America (LATAM), North America (NAM), China, African Union, and the like. In some embodiments, each intermediate level key 302b may be specific to a particular regionally approved cryptographic algorithm. For example, a particular intermediate level key

302b may be associated with those geographic regions that use a SHA3_512 cryptographic algorithm, while another intermediate level key 302b may be associated with those geographic regions that use a SHA2_384 cryptographic algorithm.

The data blob 300 provides for a relatively high level of trust for authenticating each CAI key 302c with the GGC root key 302a. In some respects, the GGC root key 302a may be considered to be a platform Root-of-Trust (RoT) known only by the vendor of the IHSs 100 in which the CAI certificate selection system is to be applied. That is, the GGC root key 302a may be used as a verifier to attest the authenticity of each of the intermediate level keys 302b, while the intermediate level keys 302b may be used as a verifier to attest the authenticity of each of the CAI keys 302c. Thus, a relatively high level of trust may be provided to ensure that any and all IHSs 100 in each geographic region uses its region's approved cryptographic algorithm.

Figure 4:
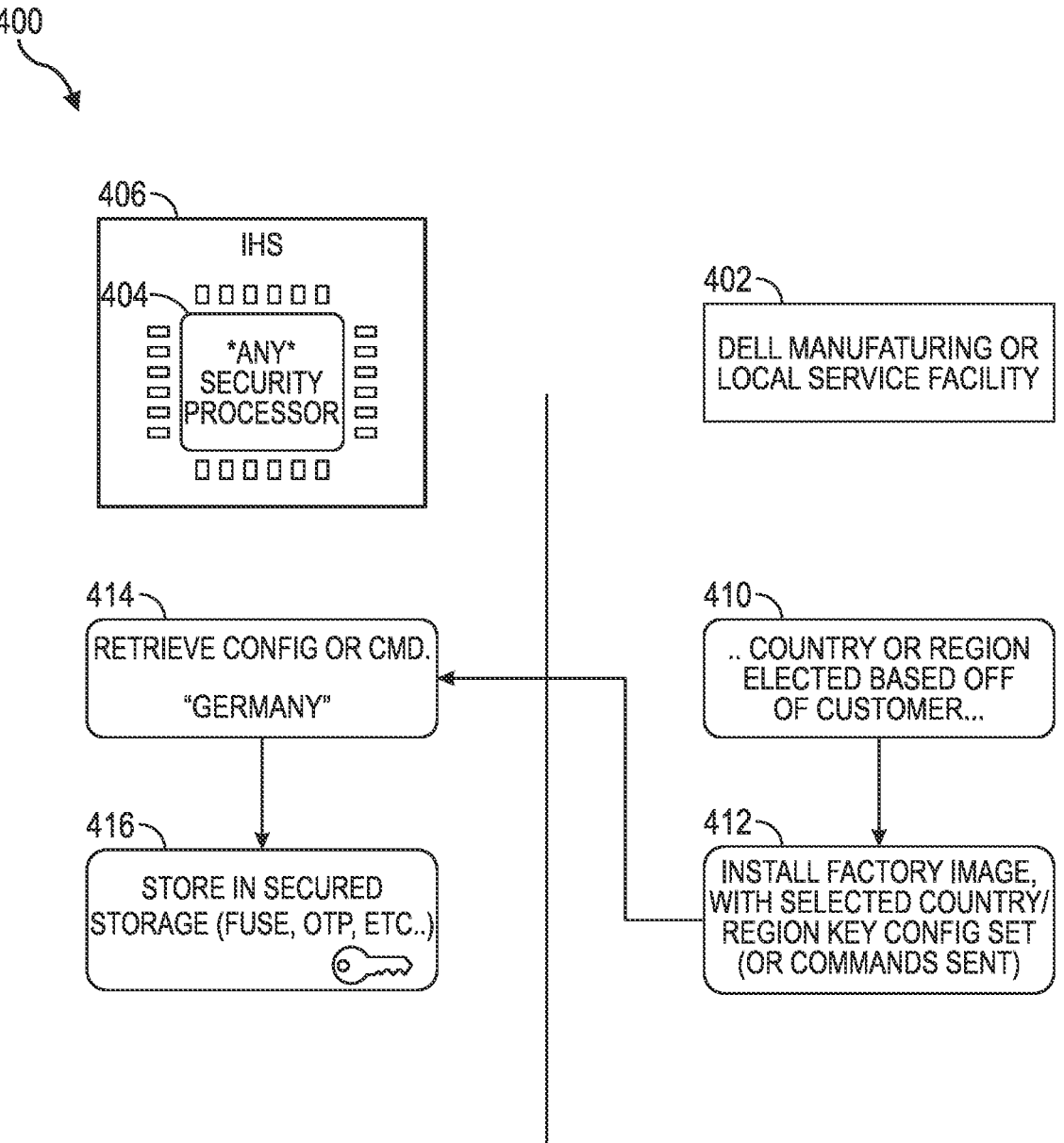
FIG. 4 illustrates an example CAI key allocation method that may be used to impart an appropriate CAI key to a target IHS according to one embodiment of the present disclosure.

FIG. 4 illustrates an example CAI key allocation method 400 that may be used to impart an appropriate CAI key 304 to a target IHS 406 according to one embodiment of the present disclosure. The CAI key allocation method 400 includes a factory IHS 402 (e.g., HSM) in communication with a target IHS 406 configured with a security processor 404. The security processor 404 may be the security processor 107 as described above, or alternatively, it may include any suitable type that provides an adequate level of security for the various features described herein. The CAI key allocation method 400 may be performed at any time, such as during manufacture or assembly of the target IHS 406 at the factory, or whenever the target IHS 406 is serviced, such as in cases where one or more security operations are to be performed on the target IHS 406.

Initially at step 410, the factory IHS 402 selects a particular country or region based on the region or country where the customer is expected to use the target IHS 406. For example, the factory may select Germany if the factory is assembling the target IHS 100 for sale in the country of Germany. At step 412, the factory IHS 402 installs the factory image (e.g., firmware, OS, etc.) along with the selected geographical region key in the target IHS 406. The security processor 404 receives the geographical region key at step 414, and stores the key in secured storage (e.g., fuse memory, One Time Programmable (OTP) memory, etc.) at step 416. At this point, the geographical region key is securely stored in the memory of the target IHS 406, and it may be shipped to the customer at that geographical region.

Figure 5:
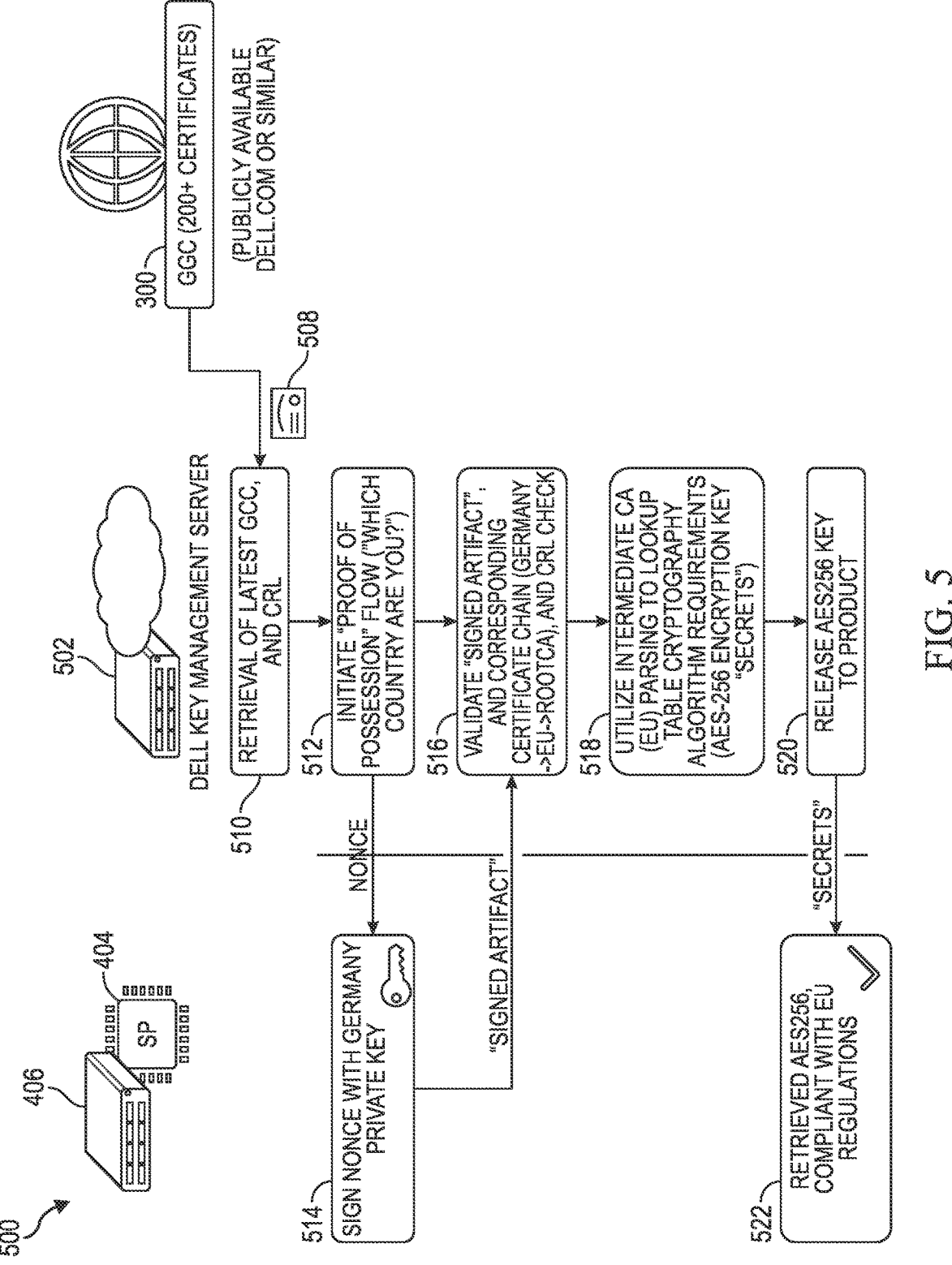
FIG. 5 illustrates an example cryptographic region attestation method that may be performed to securely configure the target IHS with its appropriate CAI key according to one embodiment of the present disclosure.

FIG. 5 illustrates an example cryptographic region attestation method 500 that may be performed to securely configure the target IHS 406 with its appropriate CAI key according to one embodiment of the present disclosure. The cryptographic region attestation method 500 generally includes a vendor Key Management Server (KMS) 502 in communication with a target IHS 100, such as via a publicly accessible network (e.g., the Internet).

The cryptographic region attestation method 500 may be performed at any suitable time, such as each time an application running on the target IHS 100 attempts to perform an operation that uses its approved geographical algorithm. For example, when the application attempts to perform the cryptographical operation that requires the use of the approved cryptographic algorithm, inhibit the cryptographic operation until the CAI key associated with an approved cryptographic algorithm for the geographical region in which the IHS 406 is operating is received from the server and stored.

At step 510, the vendor KMS 502 obtains the CAI certificate hierarchical data blob 300 and a Certificate Revocation List (CRL) 508, such as from an online source (e.g., the Internet). The CAI certificate hierarchical data blob 300 is publicly available; that is, the CAI certificate hierarchical data blob 300 does not need to be secretly stored and transported in a secure medium. In general, the CAI certificate hierarchical data blob 300 may include one CAI key for each recognized country in the World (e.g., approximately 195 countries), and approximately 20 regional intermediate level keys, thus comprising approximately a total of 215 keys.

At step 512, the vendor KMS 502 initiates a "proof of possession" flow by requesting a certificate signing request (CSR) along with a nonce to the target IHS 100. The target IHS 100 signs the nonce with its leaf level key (geographical region key), and sends the signed nonce back to the vendor GGC 502 at step 514. The vendor KMS 502 validates, at step 516, the signed nonce, and from the signed nonce identifies the CAI key (geographical region key) from the signed nonce. The vendor KMS 502 may also compare the CAI key with the data blob 300 obtained at step 510 to identify the country or region that the CAI key is associated with, and validate the CAI key by attesting to the GGC root key via the intermediate level key.

Having the CAI key of the target IHS 406, the vendor KMS 502 may access a lookup table to identify the approved cryptographic algorithm for that CAI key at step 518. Thereafter at step 520, the vendor KMS 502 releases the identified approved cryptographic algorithm key to the target IHS 406. Thus at step 522, the target IHS 406 has been configured with the appropriate approved cryptographic algorithm for its geographical region.

Figure 6:
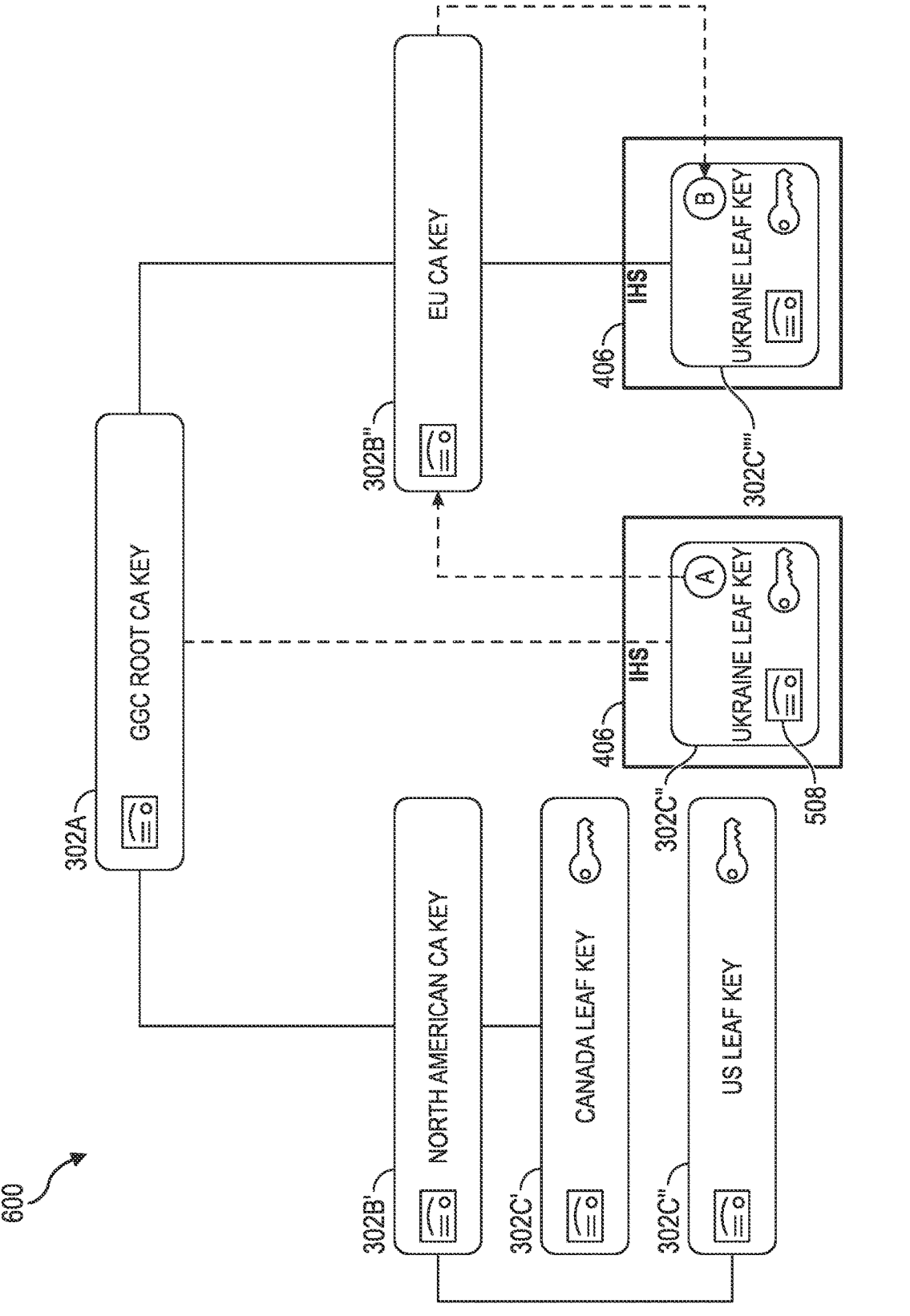
FIG. 6 illustrates an example data blob structure showing how certain keys of the CAI certificate hierarchical data blob may be arranged according to one embodiment of the present disclosure.

FIG. 6 illustrates an example data blob structure 600 showing how certain keys 302 of the CAI certificate hierarchical data blob 300 may be arranged according to one embodiment of the present disclosure. The data blob structure 600 includes a Canada CAI key 302$c'$ and a United States (US) CAI key 302$c''$ that may be arranged below a North American (NAM) key 302$b$, which is in turn, arranged below the GGC root key 302$a$. Thus, the integrity of the Canada CAI key 302$c'$ and a United States (US) CAI key 302$c''$ may be verified by the NAM key 302$b$, while the NAM key 302$b$ is verified by the root key 302$a$.

The data blob structure 600 also shows how the CAI keys 302$c$ may adapt to changes in approved cryptographic algorithms that an IHS 406 may undergo over an elapsed period of time. For example, the IHS 406 may use a Ukraine CAI key 302$c'''$ that approves use of a certain type of cryptographic algorithm (e.g., SHA2-256) prior to ascension to the European Union (EU) in 2025. However, when the country of Ukraine enters the EU in 2025, the IHS 406 may be required to use an approved cryptographic algorithm approved for use in the EU, namely SHA3-512. Thus, when the year of 2025 arrives, the CAI certificate selection system Ukraine CAI key 302$c'''$ will be included with a Certificate Revocation List (CRL) 508 that instructs the vendor KMS 502 to revoke the existing Ukraine CAI key 302$c'''$ from the IHS 406 when, for example, the steps of method 500 as described above are performed. Additionally, when the year 2025 arrives, the CAI certificate selection system replaces the Ukraine CAI key with another Ukraine CAI key 302$c''''$, which for this example embodiment, would be the SHA3-512 cryptographic algorithm. Thus, when the steps of method 500 are performed any time after the year 2025, the CAI certificate selection system may configure the IHS 406 with the new Ukraine CAI key 302$c''''$. Thus, the CAI certificate selection system may continually adapt to changes in political environments as they occur.

Figure 7:
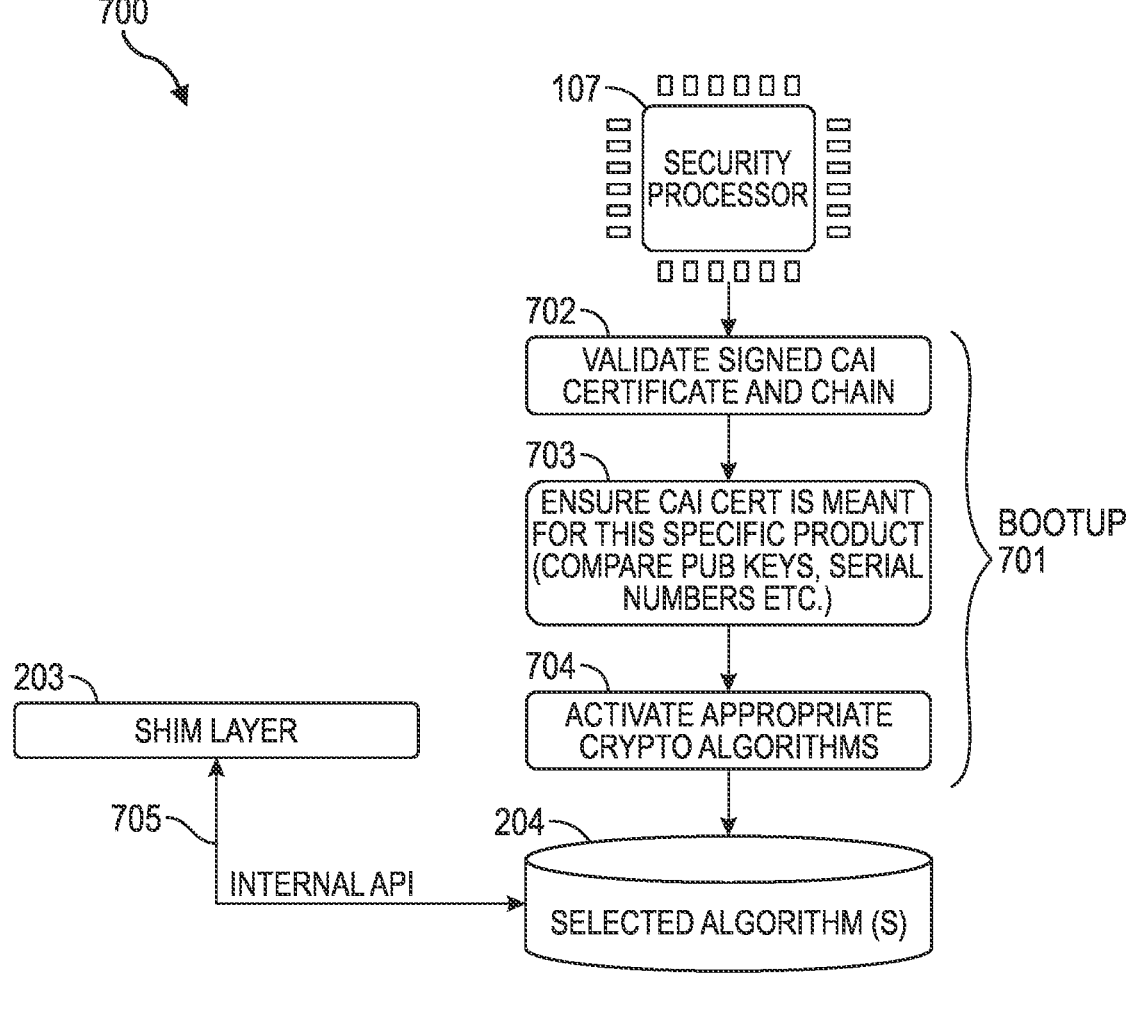
FIG. 7 depicts a diagram of an example of a method for validating a CAI certificate during bootup, according to one embodiment of the present disclosure.

FIG. 7 depicts a diagram of an example of method 700 for validating a CAI certificate during bootup 701. At 702, security processor 107 validates the signed CAI certificate and certificate chains. At 703, security processor 107 ensures that the CAI certificate is intended for use with IHS 100 (e.g., comparing public keys, serial numbers, etc.). If successful, at 704, security processor 107 activates the appropriate ones of cryptographic algorithms 204, which are then accessible to shim layer 203 via internal API 705.

Figure 8:
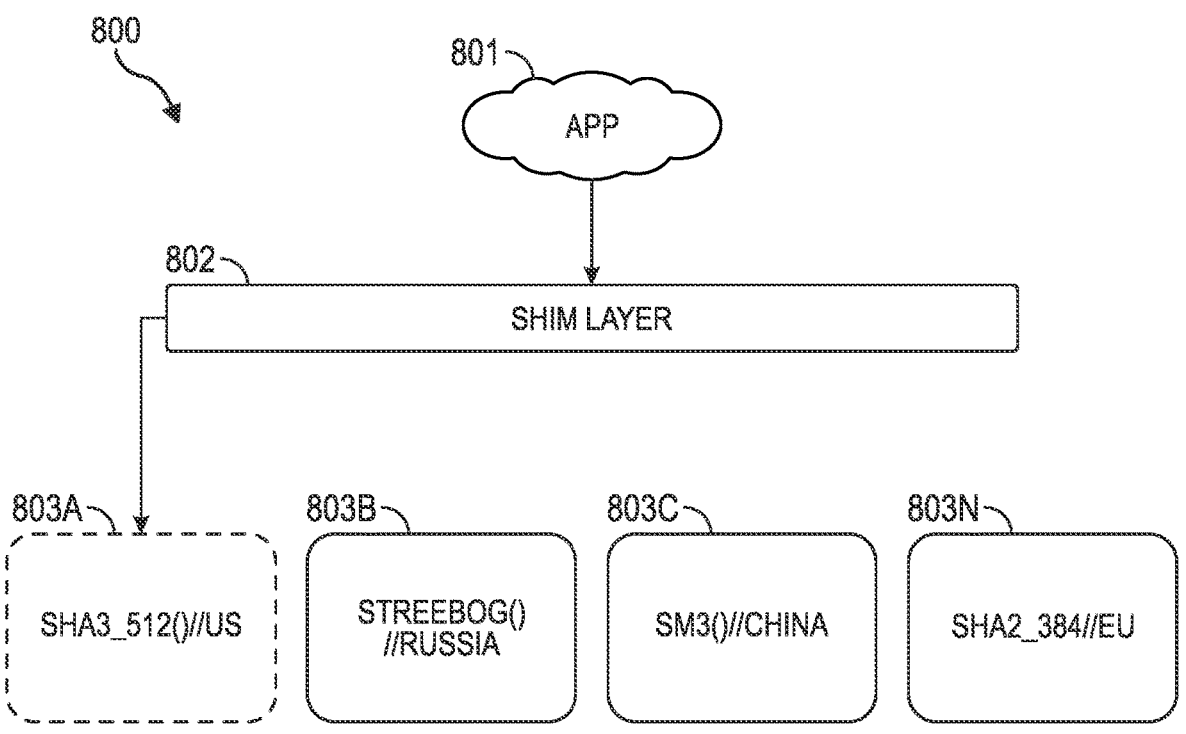
FIG. 8 depicts a diagram of an example of security processor firmware with a selected set of regional cryptographic algorithms activated for runtime use, according to one embodiment of the present disclosure.

FIG. 8 depicts a diagram of an example of security processor firmware 800 with a selected set of regional cryptographic algorithms 803A-N activated for runtime use. Particularly, upon execution of method 700, firmware 800 includes applications 801 coupled to shim layer 802 which can now access only SHA3_512( )//US algorithm 803A to the exclusion of Streebog( )//Russia 803B, SM3( )//China 803C, and SHA2_384//EU 803N.

Figure 9:
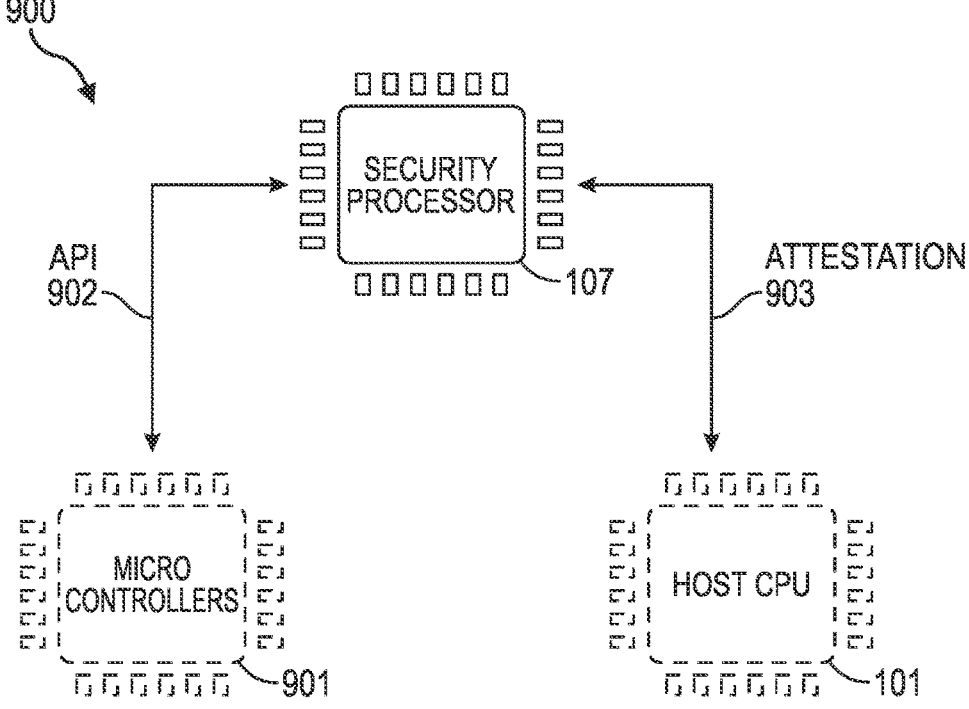
FIG. 9 depicts a diagram of an example of a method for using an activated set of regional cryptographic algorithms, according to one embodiment of the present disclosure.

FIG. 9 depicts a diagram of an example of method 900 for using an activated set of regional cryptographic algorithms. To expand modularity to other domains such as host CPU 101 and/or other microcontrollers 901 (e.g., a storage controller, Baseboard Management Controller or BMC, etc.), method 900 includes a first option for communications using API 902 and a second option via attestation 903.

Using API 902, host CPU 101 and/or other microcontrollers 901 may use security processor 107 directly for cryptographic operations. Using attestation 903, host CPU 101 and/or other microcontrollers 901 ask security processor 107 to prove possession of the CAI private key and/or to also validate the factory certificate chain. In this way other domains external to security processor 107 can have high confidence of which set of cryptographic algorithms they should be running in their own domains, thus providing full product level coverage.

In various embodiments, systems and methods described herein may provide crypto-agility to security processor 107, the ability to rapidly switch between cryptographic algorithms, primitives, and other mechanisms without the rest of the infrastructure being significantly affected, thus ensuring continuity of business amidst rapid geopolitical changes. Additionally, or alternatively, these systems and methods may be used to support long-lived IHSs (10-15 years), which may at some point cease to produce firmware updates (<7 years), thus allowing future cryptographic algorithms to be put in place ahead of being needed, without later requiring hardware or firmware changes to security processor 107.

Systems and methods described herein allow software to pre-enable new cryptographic algorithms without impacting product functionality (e.g., packaged in firmware 200, but not turned on until a later time). These systems and methods reduce the need for hardware or firmware changes to support multiple cryptographic algorithms in security processor 107 (i.e., modularity). Moreover, these systems and methods may promote the creation and maintenance of a single firmware image for security processor 107, instead of many different regional flavors.

In many implementations, systems and methods described herein may be incorporated into a wide range of electronic devices including, for example, computer systems or Information Technology (IT) products such as servers, desktops, laptops, memories, switches, routers, etc.; telecommunications hardware; consumer devices or appliances such as mobile phones, tablets, wearable devices, IoT devices, television sets, cameras, sound systems, etc.; scientific instrumentation; industrial robotics; medical or laboratory electronics such as imaging, diagnostic, or therapeutic equipment, etc.; transportation vehicles such as automobiles, buses, trucks, trains, watercraft, aircraft, etc.; military equipment, etc. More generally, these systems and methods may be incorporated into any device or system having one or more electronic parts or components.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks. The program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination thereof. Such configured devices are physically designed to perform the specified operation(s).

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), comprising:
a processor;
a memory coupled to the processor, the memory having program instructions stored thereon that, upon execution, cause the processor to:
receive a Certificate Signing Request (CSR) from a server;
sign the CSR with a first Cryptographic Algorithm Identity (CAI) key stored in the memory;
send the signed CSR to the server, wherein the server is configured to identify a geographical region that is associated with the first CAI key, identify an approved cryptographic algorithm that is approved for use in the identified region, and send a second CAI key associated with the identified approved cryptographic algorithm;
receive the second CAI key from the server; and
perform a cryptographic operation using a cryptographic algorithm associated with the second CAI key.

2. The IHS of claim 1, wherein the program instructions, upon execution, further cause the processor to identify the approved cryptographic algorithm by comparing received CAI key with a data blob that associates the received CAI key with the region.

3. The IHS of claim 2, wherein the data blob comprises a hierarchical arrangement of a plurality of layers, wherein a bottom layer of the data blob comprises a plurality of CAI keys that is each associated with one of a plurality of geographical regions.

4. The IHS of claim 3, wherein the server is further configured to verify the authenticity of the first CAI key using a root key known only to the server, wherein a top layer of the data blob comprises the root key.

5. The IHS of claim 3, wherein the server is further configured to verify the authenticity of the first CAI key using an intermediate layer between the bottom layer and the top layer, wherein the intermediate layer represents a group of individual geographic regions.

6. The IHS of claim 3, wherein the server is further configured to verify the authenticity of the first CAI key using an intermediate layer between the bottom layer and the top layer, wherein each of the intermediate layers represents one of a plurality of approved cryptographic algorithms.

7. The IHS of claim 1, wherein the program instructions, upon execution, further cause the processor to, when the second CAI key is received from the server, store the second CAI key in a secure portion of the memory.

8. The IHS of claim 7, wherein the program instructions, upon execution, further cause the processor to, when the application attempts to perform the cryptographic operation, inhibit the cryptographic operation until the second CAI key is received from the server and stored.

9. The IHS of claim 1, wherein the geographical region comprises one of a plurality of countries.

10. A Cryptographic Algorithm Identity (CAI) certificate selection method comprising:
   receiving, by a target Information Handling System (IHS), a Certificate Signing Request (CSR) from a server;
   signing, by the target IHS, the CSR with a first Cryptographic Algorithm Identity (CAI) key stored in the memory;
   sending, by the target IHS, the signed CSR to a server IHS;
   identifying, by the server IHS, a geographical region that is associated with the first CAI key;
   identifying, by the server IHS, an approved cryptographic algorithm that is approved for use in the identified region;
   sending, by the server IHS, a second CAI key associated with the identified approved cryptographic algorithm;
   receiving, by the target IHS, the second CAI key from the server; and
   performing, by the target IHS, a cryptographic operation using a cryptographic algorithm associated with the second CAI key.

11. The CAI certificate selection method of claim 10, further comprising identifying the approved cryptographic algorithm by comparing a received CAI key with a data blob that associates the received CAI key with the region, wherein the data blob comprises a hierarchical arrangement of a plurality of layers, wherein a bottom layer of the data blob comprises a plurality of CAI keys that is each associated with one of a plurality of geographical regions.

12. The CAI certificate selection method of claim 11, further comprising verifying the authenticity of the first CAI key using a root key known only to the server, wherein a top layer of the data blob comprises the root key.

13. The CAI certificate selection method of claim 11, further comprising verifying the authenticity of the first CAI key using an intermediate layer between the bottom layer and the top layer, wherein the intermediate layer represents a group of individual geographic regions.

14. The CAI certificate selection method of claim 11, further comprising verifying, by the server IHS, the authenticity of the first CAI key using an intermediate layer between the bottom layer and the top layer, wherein each of the intermediate layers represents one of a plurality of approved cryptographic algorithms.

15. The CAI certificate selection method of claim 10, further comprising, when the second CAI key is received from the server, storing the second CAI key in a secure portion of the memory.

16. The CAI certificate selection method of claim 15, further comprising, when the application attempts to perform the cryptographic operation, inhibit the cryptographic operation until the second CAI key is received from the server and stored.

17. A memory storage device having program instructions stored thereon that, upon execution by an Information Handling System (IHS), cause the IHS to:
   receive a Certificate Signing Request (CSR) from a server;
   sign the CSR with a first Cryptographic Algorithm Identity (CAI) key stored in the memory;
   send the signed CSR to the server, wherein the server is configured to identify a geographical region that is associated with the first CAI key, identify an approved cryptographic algorithm that is approved for use in the identified region, and send a second CAI key associated with the identified approved cryptographic algorithm;
   receive the second CAI key from the server; and
   perform a cryptographic operation using a cryptographic algorithm associated with the second CAI key.

18. The memory storage device of claim 17, wherein the program instructions, upon execution, further cause the processor to identify the approved cryptographic algorithm by comparing a received CAI key with a data blob that associates the received CAI key with the region.

19. The memory storage device of claim 18, wherein the data blob comprises a hierarchical arrangement of a plurality of layers, wherein a bottom layer of the data blob comprises a plurality of CAI keys that is each associated with one of a plurality of geographical regions.

20. The memory storage device of claim 19, wherein the server is further configured to verify the authenticity of the first CAI key using a root key known only to the server, wherein a top layer of the data blob comprises the root key, wherein the server is further configured to verify the authenticity of the first CAI key using an intermediate layer between the bottom layer and the top layer, wherein the intermediate layer represents a group of individual geographic regions, and wherein the server is further configured to verify the authenticity of the first CAI key using an intermediate layer between the bottom layer and the top layer, wherein each of the intermediate layers represents one of a plurality of approved cryptographic algorithms.

* * * * *